H. G. ANTHONY.
TRUCK.
APPLICATION FILED FEB. 28, 1914.
1,129,776.
Patented Feb. 23, 1915.
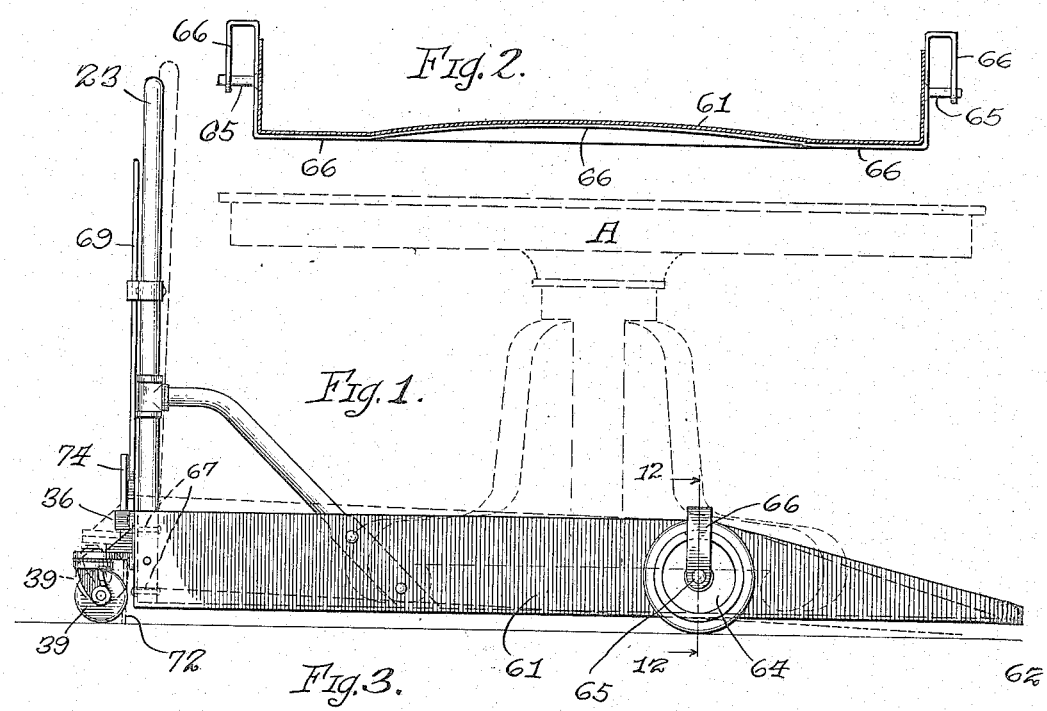
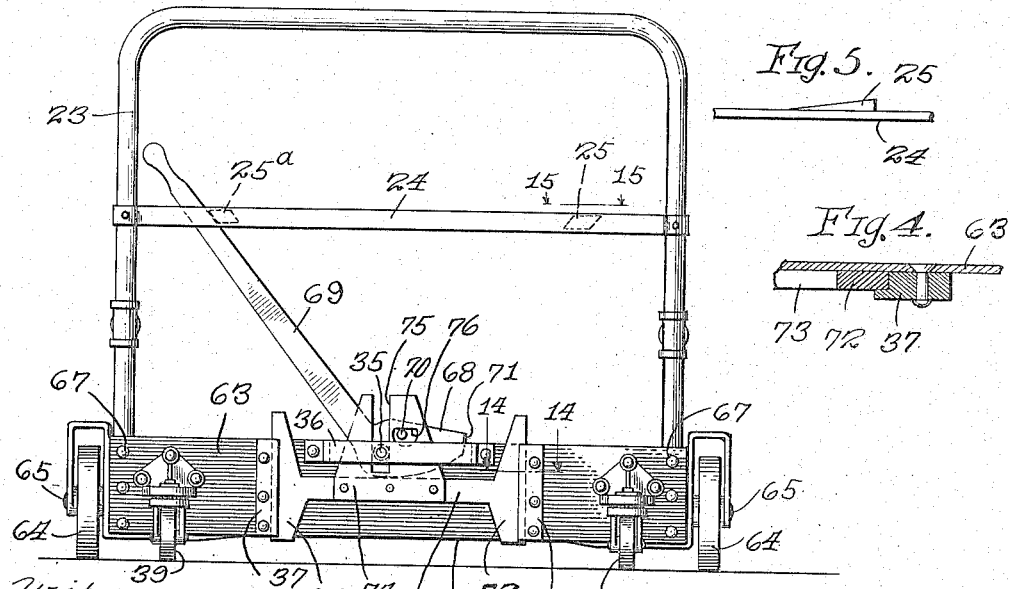
Witnesses:
L. B. Graham
R. L. Farrington
Inventor:
Harold G. Anthony
By Munn, Nissen & Sprinkle
Attys.

UNITED STATES PATENT OFFICE.

HAROLD G. ANTHONY, OF CHICAGO, ILLINOIS, ASSIGNOR OF FORTY-FIVE ONE-HUNDREDTHS TO ASA Q. REYNOLDS, OF CHICAGO, ILLINOIS.

TRUCK.

1,129,776.  Specification of Letters Patent.  Patented Feb. 23, 1915.

Application filed February 28, 1914. Serial No. 821,703.

*To all whom it may concern:*

Be it known that I, HAROLD G. ANTHONY, a citizen of the United States, residing at Chicago, in the county of Cook and State of Illinois, have invented certain new and useful Improvements in Trucks, of which the following is a specification.

My invention relates to trucks and has for its primary object the provision of an improved truck which shall have means for causing the weight supporting portion of the truck to be placed upon or near the floor during the processes of loading and unloading.

With the above and other objects in view this invention consists substantially in the combination, arrangement, and construction of parts all as hereinafter described, shown in the accompanying drawings which form a part of this specification and illustrate the preferred embodiment of my invention, and more particularly set forth in the subjoined claims.

In the drawings: Figure 1 is a view of a modified form of my truck, illustrating in dotted lines a weight supported upon the body thereof. Fig. 2 is a section taken on line 12—12 of Fig. 1. Fig. 3 is an end elevation of the modified form of truck illustrated in Fig. 1. Fig. 4 is a partial section taken on line 14—14 of Fig. 3. Fig. 5 is a detailed view taken on line 15—15 of Fig. 3.

In the drawings the bed, which is here numbered 61, is provided with an open front end 62, and a rear end plate 63. Positioned at a suitable point rearward of the front end are opposite wheels 64, journaled on suitable axles 65. Preferably a single strip 66 is disposed across the bed 61 between the axles 65, and is at its ends bent upwardly, outwardly and downwardly, into the shape of an inverted U, to form bearings for the outer ends of the axles 65. Intermediate the sides of the truck the strip 66 and the bed 61 are preferably upcurved and welded or otherwise fastened together in that position for the purpose of strengthening the bed 61 against sagging. The steering frame 23, which is preferably provided in each of the trucks described in this application, is positioned at the rearward end, and riveted as at 67 to the ends of the end plate 63. Adjacent the ends of the end plate 63 and upon the outer side thereof are secured two swiveled casters 39. Adjacent the center of the end plate 63 there is fixed thereto a pivot pin 35, upon which is journaled a cam 68, provided with a lever 69 and an outwardly projecting stud 70, the extremity of the cam 68 being flattened as at 71. A support 36 is provided upon the outer side of the end plate 63 and in it is journaled the outer end of the pivot pin 35. Channel guides 37 are positioned upon the outer side of the end plate 63 at a suitable distance apart but between the casters 39, and they are engaged by legs 72, which are preferably carried upon the opposite ends of a cross-bar 73. A guide plate 74 is fixed adjacent the center of the cross-bar 73 and extends upwardly between the outer face of the cam 68 and the adjacent face of the support 36, being vertically slotted as at 75 for engagement with the pivot 35. The guide plate 74 is provided likewise with an aperture 76 of a suitable size for the necessary relative movement between the pin 70 and the guide plate, and which is engaged by the pin 70. The legs 72 are vertically movable with respect to the channel guides 37 and the bed 61. The cross-bar 24 in this embodiment of my invention is provided at one side with a catch 25 and the other side of the truck with a catch 25ᵃ (see Fig. 3). Movement of the handle 69 from the position shown in Fig. 3 toward the catch 25 oscillates the cam 68 about the pivot pin 35 and lowers the legs 72 until they contact with the floor, as illustrated in dotted lines in Fig. 1. Further movement of the handle 69 toward the catch 25 elevates the rearward end of the truck into the position illustrated in dotted lines in Fig. 1, raising the casters 39 from the floor and causing the forward end 62 of the bed 61 to engage the floor, the weight of the rearward end of the truck being, in this position of the parts, supported by the legs 72 through the cross-bar 73, cam 68, and pivot pin 35. When the movement of the handle 69 just mentioned has continued to the end of its path of throw the handle engages the catch 25 and the flattened end 71 of the cam 68 is throughout its length in engagement with the upper surface of the cross-bar 73.

In the use of the embodiment of my invention illustrated in Figs. 1 to 5 inclusive the truck is placed in the position just above described, wherein the front end 62 and the wheels 64 are in contact with the floor, the casters 39 are elevated from the floor and the rearward end of the truck rests upon the legs 72. The object A to be transported is in this position of the truck easily shifted onto the bed 61, following which the handle 69 is oscillated from its then position in engagement with the catch 25 toward the catch 25ᵃ. This oscillation of the handle lowers the casters 39 into contact with the floor, simultaneously raising the front end 62 out of contact with the floor. Continued oscillation of the handle 69 toward the catch 25ᵃ causes the stud 70 to engage the guide plate 74 at the upper edge of the aperture 76 and raises the guide plate 74, the cross-bar 73, and the legs 72 until the legs are out of contact with the floor, whereupon the handle 69 engages the catch 25ᵃ. The truck, being now supported in spaced relation to the floor by means of the wheels 64 and casters 39, may be rolled to any location desired for the object A, following which a reversal of the action just described will again position the forward end of the truck in contact with the floor and admit of the removal of the object A from the bed 61. The lower or floor contacting ends of the legs 72 are not provided with rollers of any kind, but are intended to have frictional contact with the floor, for by means of such contact the truck is retained in position during the time that the object A is being loaded upon the truck. It is further to be noted that when the object A has been loaded and the truck is in position to be rolled about, the legs 72 are maintained in convenient spaced relation to the floor and are not in position to engage any small projections which may protrude from the floor, such as loose nails or other objects. A convexity is produced in the bed 61 where it engages the strip 66 and is braced thereby between the axles 65, but this convexity preferably does not extend to the forward edge of the truck, the forward edge being in the present embodiment of the invention preferably a straight edge parallel with the floor.

In the accompanying drawings and in the foregoing description is set forth the preferred embodiment of my invention, but it is obvious that one skilled in the art may make modifications thereof without departing from the spirit of the invention.

I claim:

1. The combination with a truck bed, of supporting wheels therefor, certain of said wheels being positioned at one end of the truck bed; a leg member mounted at said end of the truck bed; and a manually operable lever mounted on said end of the truck bed engaging said leg member and adapted to move the latter downwardly and shift the weight of said truck bed end from the last mentioned wheels to said leg member.

2. The combination with a truck bed, of supporting wheels therefor, certain of said wheels being positioned at one end of the truck bed; a lever provided with a cam end and pivoted to said truck bed; and means on said end of the truck bed, engaging the cam end of the lever and adapted when the latter is in one position to cause the wheels at said truck bed end to support the latter and when said lever is in another position to cause said last mentioned wheels to be supported by said end of the truck bed.

3. The combination with a truck bed having an open end, of supporting wheels positioned intermediate the ends of the bed on opposite sides thereof, supporting casters carried by the end of the bed opposite to the open end, and means upon the castered end of the bed for elevating that end and depressing the open end into contact with the floor, comprising legs carried by the truck bed and apparatus for lowering said legs into contact with the floor and elevating and supporting the castered end of the bed upon said legs.

4. The combination with a truck bed having an open end, of supporting wheels positioned intermediate the ends of the bed on opposite sides thereof, supporting casters carried by the end of the bed opposite to the open end, and means upon the castered end of the bed for elevating that end and depressing the open end into contact with the floor, comprising legs carried by the truck bed and apparatus for lowering said legs into contact with the floor and elevating and supporting the castered end of the bed upon said legs, said legs having frictional contact with the floor.

5. The combination with a truck bed, of supporting wheels therefor, certain of said wheels being positioned at one end of the truck bed; a lever provided with a cam end and pivoted to said truck end; a leg member slidably mounted on said end of the truck bed and engaging said cam end, the cam end of said lever when in one position being adapted to cause the leg member to support said end of the truck bed and when in another position being adapted to support the leg member on the truck bed end.

6. The combination with a truck bed, of supporting wheels therefor, certain of said wheels being positioned at one end of the truck bed; a lever provided with a cam end and pivoted to said truck end; a leg member slidably mounted on said end of the truck bed and engaging said cam end, the cam end of said lever when in one position being adapted to cause the leg member to support said end of the truck bed and wheels at such end of the truck bed, and when in another position being adapted to support the leg member on the truck bed end.

7. The combination with a truck bed, of fixed axles upon opposite sides thereof intermediate the ends thereof and equidistant from one end, wheels upon said axles, casters upon one end of the truck bed, said wheels and casters normally supporting the bed out of contact with the floor, legs secured to the castered end of the bed and movable with respect thereto, and apparatus carried by the bed for lowering said legs into contact with the floor, elevating the casters from the floor, and tilting the opposite end of the bed into contact with the floor.

8. The combination with a truck bed, of fixed axles upon opposite sides thereof intermediate the ends thereof and equidistant from one end, wheels upon said axles, casters upon one end of the truck bed, said wheels and casters normally supporting the bed out of contact with the floor, legs secured to the castered end of the bed and movable with respect thereto, and apparatus carried by the bed for lowering said legs into contact with the floor, elevating the casters from the floor, and tilting the opposite end of the bed into contact with the floor, comprising a pivot pin fixed to the bed, a connecting bar upon the ends of which the legs are carried, and a cam upon the pin and contacting with the connecting bar to cause relative movement between the legs and the bed.

9. The combination with a truck bed of fixed axles upon opposite sides thereof intermediate the ends thereof and equidistant from one end, wheels upon said axles, casters upon one end of the truck bed, said wheels and casters normally supporting the bed out of contact with the floor, legs secured to the castered end of the bed and movable with respect thereto, and apparatus carried by the bed for lowering said legs into contact with the floor, elevating the casters from the floor, and tilting the opposite end of the bed into contact with the floor, comprising a connecting bar upon the ends of which the legs are carried, a pivot pin protruding from the truck bed, a guide plate slotted for engagement with the pivot pin, apertured, and carried by the connecting bar, a cam pivoted upon the pivot pin, and a stud upon the cam engaging the aperture of the guide plate.

10. The combination with a truck bed having an open end, of a steering frame secured thereto at the opposite end, wheeled supports on opposite sides of the bed intermediate the ends thereof, castered supports for that end of the truck bed at which the steering frame is positioned, a catch fixed upon the steering frame, and apparatus having frictional contact with the floor for elevating the castered end from the floor to cause the open end to contact with the floor and including a cam, said cam engaging the catch to lock the truck in tilted position.

11. The combination with a truck bed, of a flat strip of material transversely positioned upon the under side of the bed, bent upwardly, outwardly and downwardly at each of its ends, axles journaled in the bent ends of said strips, and wheels carried by the axles.

12. The combination with a truck bed, of a flat strip of material transversely positioned upon the under side of the bed, bent upwardly, outwardly, and downwardly at each of its ends, axles journaled in the bent ends of said strips, and wheels carried by the axles, said strip and bed being up-bent about the center of the bed and fastened together in that position.

In testimony whereof I have signed my name to this specification, in the presence of two subscribing witnesses, on this 24th day of February A. D. 1914.

HAROLD G. ANTHONY.

Witnesses:
CHARLES H. SEEM,
HAROLD G. ROCKWELL.